(12) United States Patent
Kim

(10) Patent No.: US 7,185,544 B2
(45) Date of Patent: Mar. 6, 2007

(54) APPARATUS AND METHOD FOR SENSING OPENING AND SHUTTING OF WIRELESS COMMUNICATION TERMINAL BY USING STRAIN GAUGE

(75) Inventor: Cheul Min Kim, Ichon-shi (KR)

(73) Assignee: Curitel Communications, Inc., Ichon-shi (KR)

( * ) Notice: Subject to any disclaimer, the term of this patent is extended or adjusted under 35 U.S.C. 154(b) by 68 days.

(21) Appl. No.: 11/061,507

(22) Filed: Feb. 22, 2005

(65) Prior Publication Data
US 2005/0279176 A1  Dec. 22, 2005

(30) Foreign Application Priority Data
Jun. 21, 2004  (KR) ............. 10-2004-0046156

(51) Int. Cl.
*G01B 5/30* (2006.01)
*G01B 7/16* (2006.01)

(52) U.S. Cl. ........................................ 73/760

(58) Field of Classification Search ........... 73/760
See application file for complete search history.

(56) References Cited

U.S. PATENT DOCUMENTS

| | | | | |
|---|---|---|---|---|
| 6,434,404 | B1* | 8/2002 | Claxton et al. | 455/575.3 |
| 2003/0092470 | A1* | 5/2003 | Kurakane | 455/566 |
| 2003/0199290 | A1* | 10/2003 | Viertola | 455/575.1 |
| 2004/0201988 | A1* | 10/2004 | Allen | 362/249 |
| 2005/0208903 | A1* | 9/2005 | Sakamoto | 455/90.3 |

* cited by examiner

*Primary Examiner*—Max Noori
(74) *Attorney, Agent, or Firm*—Oblon, Spivak, McClelland, Maier & Neustadt, P.C.

(57) ABSTRACT

Provided is an apparatus and method for sensing the opening and shutting by using a strain gauge. The apparatus and method can reduce power consumption by using an output value of an analog-to-digital converter based on an output voltage value to sense opening and shutting and supplying or shutting off power. The opening and shutting apparatus includes: a strain gauge having a resistance value which is varied as the strain gauge is deformed by an external force; a voltage distributor for distributing voltage to the strain gauge based on the resistance value; an analog-to-digital (A/D) converter for converting the voltage of the strain gauge into a digital output value; and a controller for controlling the power to be supplied to or shut off from predetermined elements of a wireless communication terminal by sensing the opening and shutting based on the output from the A/D converter.

4 Claims, 3 Drawing Sheets

APPARATUS AND METHOD FOR SENSING OPENING AND SHUTTING OF WIRELESS COMMUNICATION TERMINAL BY USING STRAIN GAUGE

FIELD OF THE INVENTION

The present invention relates to an apparatus and method for sensing the opening and shutting of a mobile communication terminal by using a strain gauge; and, more particularly, to an opening and shutting apparatus and method using a strain gauge that can reduce power consumption by sensing opening and shutting of a device and supplying or shutting off power. The apparatus can sense the opening and shutting of the mobile communication terminal by using an output value of an analog-to-digital (A/D) converter based on an output voltage value, which is changed by a resistance value which is varied as the strain gauge is deformed by an external force.

DESCRIPTION OF RELATED ART

Hereinafter, the present invention will be described by taking an example of a wireless communication terminal which includes an opening and shutting sensing apparatus using a strain gauge.

The wireless communication terminal mentioned in the present invention is a portable terminal capable of wireless communication, e.g., a personal communication services (PCS) terminal, a personal digital assistant (PDA) terminal, a smart phone, an International Mobile Telecommunication 2000 (IMT-2000) terminal, and a wireless Local Area Network (LAN) terminal.

Generally, the strain gauge is a device for measuring deformation state and quantity of a structure. The strain gauge is mounted on the surface of the structure.

Before the description on the strain gauge, strain will be described first. Strain means a deformation degree or a deformation rate, which is a value expressed as a ratio of an extended length or a contracted length to the original length when an object is extended or compressed. Strain does not have a unit but, if necessary, it can be expressed on a basis of cm/cm and mm/mm. Strain is a term used when a structure is deformed by an external force in the fields where structures or mechanical elements are analyzed and designed, such as civil engineering, mechanical engineering, architectural engineering, aeronautical engineering and shipbuilding engineering.

Generally, strain gauges are categorized into two types: an electrical strain gauge and a mechanical strain gauge. The electrical strain gauge measures strain electrically, while the mechanical strain gauge measures it mechanically. The electrical strain gauge measures the deformation rate of a structure based on electrical resistance of the strain gauge attached to the structure, when the structure is deformed. The mechanical strain gauge measures the deformation rate of the structure by measuring a minute change in the distance between two points mechanically. The development of the strain gauges allows precise measurement of structure deformation.

Meanwhile, the shape and length of the strain gauge are different according to the material that forms the structure. If the structure is formed of metal or steel materials, a 5 mm-size gauge is used, while a 30 to 100 mm-size gauge is commonly used for concrete structure. Also, the strain gauge comes in the forms of an attachable gauge that is attached to the surface of a structure and an embedded strain gauge which is embedded and installed in the inside of the structure or an object, when the structure or object is formed.

Conventionally, a physical switch or a hole integrated circuit (IC) is used when the wireless communication terminal is opened or shut. The method using a physical switch is called a contact-point method, and the method using a hole IC is called a magnetic sensing method.

In the magnetic sensing method, the opening of a folder or a flip of the wireless communication terminal is sensed by a magnetic sensor. The magnetic sensing method takes an advantage of a principle that current flows through iron when a magnet is brought close to the iron and the current is shut off when the magnet is taken away from the iron. The magnetic sensor includes two pieces of iron placed very close to each other. If a magnet is brought to the two pieces of iron, the two are magnetized and attached to each other. This is used for the folder or flip of the wireless communication terminal. If the folder or flip of the wireless communication terminal is open and a magnet is brought to the wireless communication terminal, the wireless communication terminal recognizes that the folder or flip is closed and thus the backlight and liquid crystal display (LCD) is turned off. However, the magnetic sensing method is burdensome in the respect of cost.

The physical contact-point method, too, has a risk of contact-point dysfunction caused by a minute instrumental difference.

Both of the conventional methods have a problem that current is consumed wastefully because the backlight connected to LCD and keypad is turned on if the wireless communication terminal has an opening and shutting tilt as small as 5 to 10°.

SUMMARY OF THE INVENTION

It is, therefore, an object of the present invention to provide an apparatus and method for sensing the opening and shutting of a wireless communication terminal using a strain gauge that can reduce power consumption by sensing the opening and shutting of a device and supplying or shutting off power. The apparatus can sense the opening and shutting of the wireless communication terminal by using an output value of an analog-to-digital (A/D) converter based on an output voltage value, which is changed by a resistance value which is varied as the strain gauge is deformed by an external force.

The above and other objects and features of the present invention will become apparent from the following description of the preferred embodiments. Also, it can be understood easily that the objects and advantages of the present invention can be embodied by the means as claimed and combinations thereof.

In accordance with an aspect of the present invention, there is provided an opening and shutting apparatus using a strain gauge, the apparatus which includes: a strain gauge having a resistance value which is varied as the strain gauge is deformed by an external force; a voltage distributor connected to a power supplier in serial to distribute a voltage to the strain gauge based on the varying resistance value; an analog-to-digital (A/D) converter for converting the voltage of the strain gauge into a digital signal; and a controller for controlling the power source to be supplied to or shut off from internal elements of the opening and shutting apparatus by sensing the opening and shutting based on the output from the A/D converter.

In accordance with another aspect of the present invention, the opening and shutting apparatus further includes a capacitor for removing noise included in the power source supplied from the power supplier. The capacitor is connected to the power supplier in parallel.

In accordance with another aspect of the present invention, there is provided a method for sensing the opening and shutting by using a strain gauge, the method which includes the steps of: a) a resistance value being changed as the strain gauge is deformed by an external force; b) voltage of the strain gauge being changed based on the changed resistance value; c) converting the voltage of the strain gauge into a digital signal; and d) supplying or shutting off a power source to or from internal elements by sensing the opening and shutting based on the output value which is converted into the digital signal, which will be referred to as a digital output value hereafter.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter. Accordingly, the technological concept of the present invention can be embodied those skilled in the present invention easily. If detailed description on a conventional technology is determined to blur the point of the present invention, it will be omitted. Hereinafter, the present invention will be described with reference to the accompanying drawings.

Figure 1:
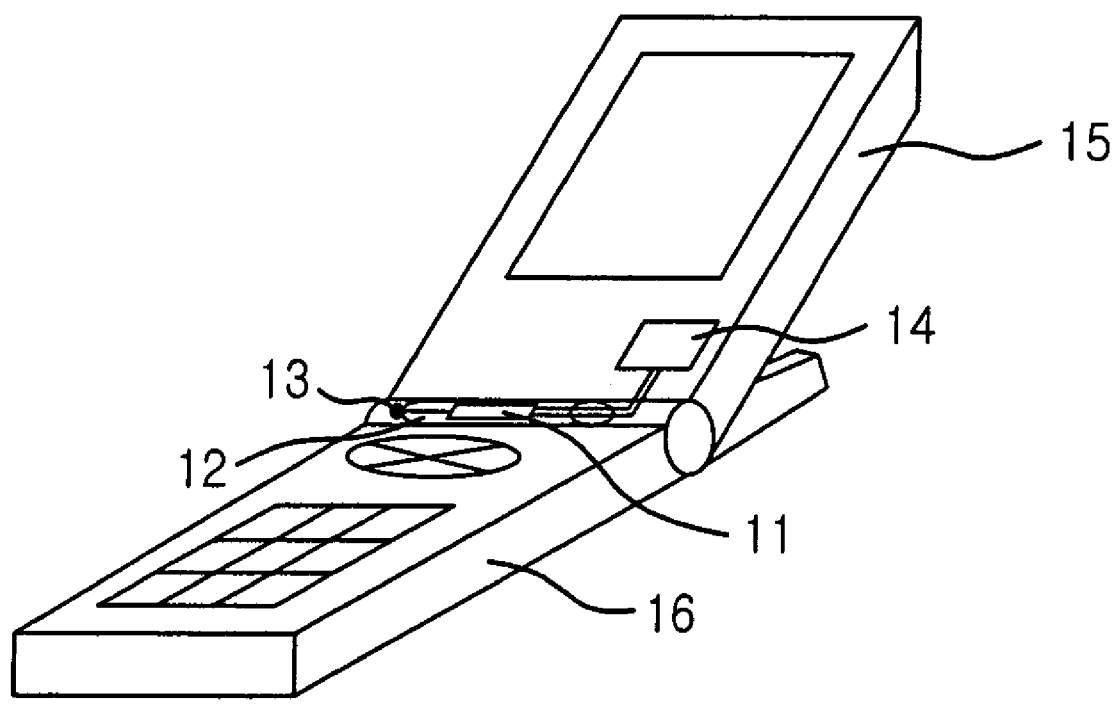
FIG. 1 is a diagram showing a wireless communication terminal including an apparatus for sensing the opening and shutting of the wireless communication terminal using a strain gauge in accordance with an embodiment of the present invention.

FIG. 1 is a diagram showing a wireless communication terminal including an apparatus for sensing the opening and shutting using a strain gauge 11 in accordance with an embodiment of the present invention.

As shown, the wireless communication terminal includes a body 16 and a folder 15 connected with each other by using a hinge 12 based on a fixing shaft 13. In an example of the wireless communication terminal, the strain gauge 11 is located in the inside of the hinge 12. However, the strain gauge 11 can be installed in any place as long as it can detect deformation caused by the opening and shutting of the cover, e.g., a folder.

Meanwhile, the folder 15 is supplied with electric power from the body 16. To receive the power, a cable for providing power is connected between the folder 15 and the body through the hinge 12.

The strain gauge 11 has a resistance value changed upon the deformation by the external force, i.e., the opening and shutting of the folder in a mobile phone. Since the power from the power supplier is distributed to the strain gauge 11 and the resistor 14, the voltage of the strain gauge 11 is variable.

Figure 2:
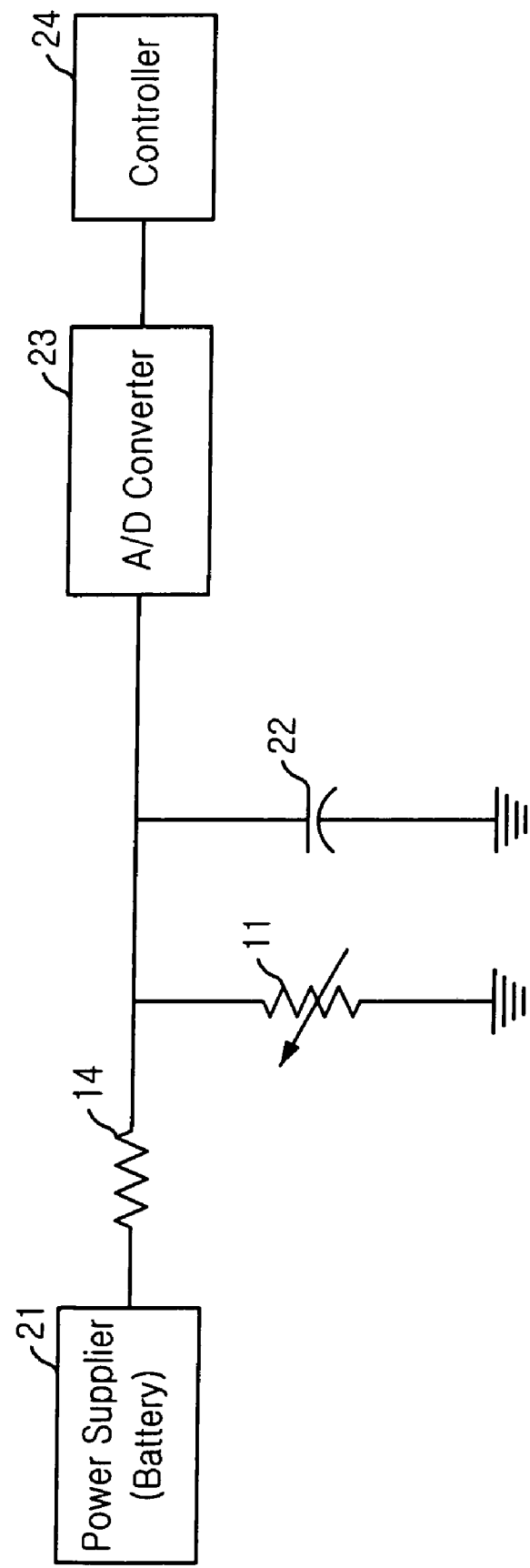
FIG. 2 is a diagram illustrating an apparatus for sensing the opening and shutting of a wireless communication terminal using a strain gauge in accordance with an embodiment of the present invention.

Therefore, in FIG. 2, a controller 24 can detect whether a cover is opened or shut based on a digital output signal value obtained by converting the voltage of the strain gauge 11 and thus determines to supply or shut off the power to backlight connected to a Liquid Crystal Display (LCD) and a keypad.

FIG. 2 is a block diagram illustrating an opening and shutting sensing apparatus using a strain gauge 11 in accordance with an embodiment of the present invention.

As shown, an apparatus for sensing the opening and shutting of a wireless communication terminal using the strain gauge 11 in accordance with the an embodiment of present invention, includes a power supplier 21, e.g., battery, a strain gauge 11, a resistor 14, a shunt capacitor 22, an analog-to-digital (A/D) converter 23 and a controller 24. The power supplier 21 provides a power to the elements of the opening and shutting sensing apparatus. The strain gauge 11 includes a resistance value changed upon deformation caused by an external force. The resistor 14 is connected to the power supplier 21 in serial to distribute a different voltage value to the strain gauge 11 based on the resistance value. The shunt capacitor 22 removes noise from the power transmitted through the resistor 14. The A/D converter 23 converts the voltage of the strain gauge 11 into a digital signal.

The controller 24 supplies or shuts off power to the elements of the opening and shutting apparatus by sensing the opening and shutting of the folder based on the output from the A/D converter 23.

Herein, the shunt capacitor 22, which is an additional element, is connected in parallel to the power supplier 21 in order to remove noise supplied from the power supplier 21. The power supplier 21 outputs not only clean serial voltage but also delicate low frequency signals as well. The low frequency noise has an effect that low frequency oscillation is brought into the circuit. It degrades the performance of the circuit along with low frequency oscillation generated in the inside of the circuit. Therefore, the low frequency noise should be removed through the shunt capacitor 22 positioned on the side of the power source output. Since the low frequency noise generally contains very low frequencies, the capacitance value becomes larger. Therefore, a large-volume capacitor of an uF unit such as a tantalum capacitor is used as the shunt capacitor 22 for removing noise in the power supplier 21.

Figure 3:
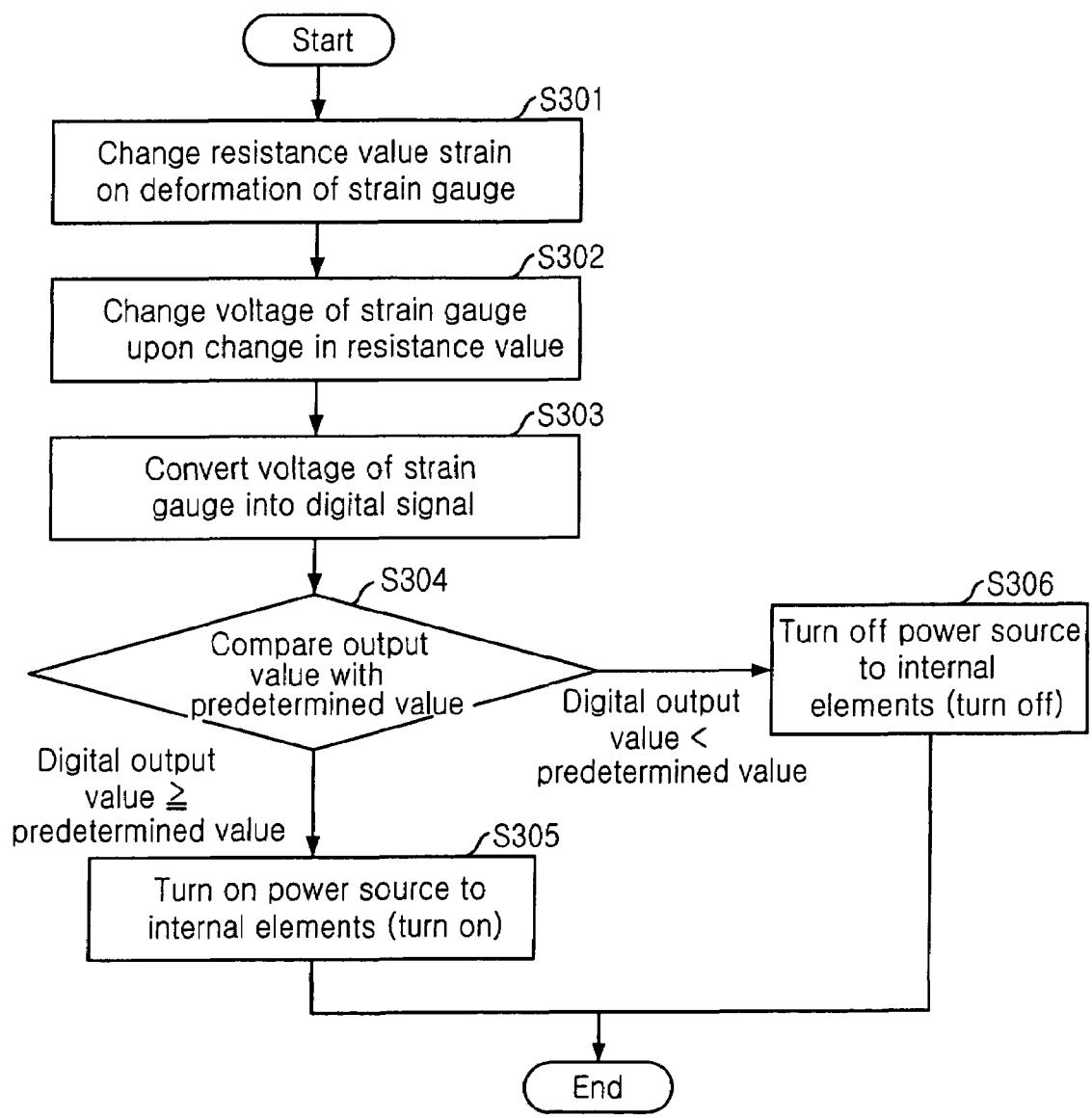
FIG. 3 is a flowchart describing an apparatus for sensing the opening and shutting of a wireless communication terminal using a strain gauge in accordance with an embodiment of the present invention.

FIG. 3 is a flowchart describing an apparatus for sensing the opening and shutting of a wireless communication terminal using a strain gauge 11 in accordance with an embodiment of the present invention.

First, at step S301, a resistance value is changed as the strain gauge 11 is deformed. At step S302, voltage of the strain gauge 11 is changed as the resistance value of the strain gauge 11 is changed, because the voltage is distributed to the resistor 14 and the strain gauge 11.

Subsequently, at step S303, the A/D converter 23 converts the voltage of the strain gauge 11 into a digital signal, which will be referred to as a digital output value hereafter, and transmits the digital output value to the controller 24.

At step S304, the controller 24 compares the digital output value with a predetermined value.

At step S305, if the digital output value is equal to or larger than the predetermined value, the power is supplied to predetermined elements of the wireless communication terminal, e.g., a keypad and a display.

Otherwise, if the digital output value is smaller than the predetermined value, at step S306, the power is shut off from the predetermined elements of the wireless communication terminal.

As described above, the opening and shutting apparatus of the present invention can reduce power consumption by sensing the opening and shutting of the folder 15 based on the output value of the A/D converter, when the strain gauge 11 is deformed by an external force and supplying or shutting off the power. The output value of the A/D converter 23 is changed based on the output voltage value, which is changed according to the resistance value.

The present application contains subject matter related to Korean patent application No. 2004-0046156, filed in the Korean Intellectual Property Office on Jun. 21, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An opening and shutting apparatus provided with a power supplier, comprising:
    a strain gauge having a resistance value which is varied as the strain gauge is deformed by an external force;
    a voltage distributor connected in series between the power supplier and the strain gauge to distribute a voltage to the strain gauge based on the resistance value;
    an analog-to-digital (A/D) converter for converting the voltage of the strain gauge into a digital signal as an output;
    a controller for controlling a power to be supplied to or shut off from predetermined elements of a wireless communication terminal by sensing an opening and shutting based on the output from the A/D converter; and
    a capacitor connected in series to the power supply via the voltage distributor to remove noise from the power supplied from the power supplier.

2. The opening and shutting apparatus as recited in claim 1, wherein the strain gauge is positioned in a hinge.

3. A method for sensing opening and shutting utilizing an opening and shutting apparatus provided with a power supplier, including a strain gauge having a resistance value which is varied as the strain gauge is deformed by an external force, a voltage distributor connected in series between the power supplier and the strain gauge to distribute a voltage to the strain gauge based on the resistance value, an analog-to-digital (A/D) converter for converting the voltage of the strain gauge into a digital signal as an output, a controller for controlling a power to be supplied to or shut off from predetermined elements of a wireless communication terminal by sensing an opening and shutting based on the output from the A/D converter, and a capacitor connected in series to the power supply via the voltage distributor to remove noise from the power supplied from the power supplier, comprising the steps of:
    a) changing the resistance value as deformation is applied to the strain gauge;
    b) changing the voltage of the strain gauge based on the changed resistance value;
    c) converting the voltage of the strain gauge into a digital signal; and
    d) supplying or shutting off the power to or from predetermined elements of a wireless communication terminal by sensing the opening and shutting based on the digital signal.

4. The method as recited in claim 3, wherein the step d) includes the steps of:
    d1) comparing the digital output value with a predetermined value;
    d2) if the digital output value is equal to or larger than the predetermined value, supplying the power to the predetermined elements; and
    d3) if the digital output value is smaller than the predetermined value, shutting off the power from the predetermined elements.

* * * * *